United States Patent [19]
Raynak et al.

[11] Patent Number: 5,680,549
[45] Date of Patent: Oct. 21, 1997

[54] SYSTEM FOR TRANSFERRING NETWORK CONNECTIONS FROM FIRST TO SECOND PROGRAM WHERE THE FIRST ENTERS AN INACTIVE STATE AND RESUMES CONTROL OF CONNECTIONS WHEN SECOND TERMINATES

[75] Inventors: Randy W. Raynak; Viktor Kushnir, both of Columbus, Ohio

[73] Assignee: CompuServe Incorporated, Columbus, Ohio

[21] Appl. No.: 366,979

[22] Filed: Dec. 30, 1994

[51] Int. Cl.$^6$ ................................................. G06F 13/00
[52] U.S. Cl. .................................... 395/200.12; 395/680
[58] Field of Search ................ 364/240.8, 242.94, 364/242.95, 228.4, 284.4, 940.61, 940.62; 379/96, 201; 395/200.01, 200.03, 200.09, 200.1, 200.15, 500, 650, 700

[56] References Cited

U.S. PATENT DOCUMENTS

| | | | |
|---|---|---|---|
| 4,257,096 | 3/1981 | McCullough et al. | 395/200 |
| 4,780,821 | 10/1988 | Crossley | 395/650 |
| 4,845,644 | 7/1989 | Anthias et al. | 395/500 |
| 4,891,785 | 1/1990 | Donohoo | 395/200.01 |
| 4,949,248 | 8/1990 | Caro | 395/200.09 |
| 5,228,137 | 7/1993 | Kleinerman et al. | 395/500 |
| 5,265,239 | 11/1993 | Ardolino | 395/500 |
| 5,315,711 | 5/1994 | Barone et al. | 395/275 |
| 5,329,619 | 7/1994 | Page et al. | 395/200.01 |
| 5,347,632 | 9/1994 | Filepp et al. | 395/200.09 |
| 5,404,519 | 4/1995 | Denio | 395/650 |
| 5,410,703 | 4/1995 | Nilsson et al. | 395/700 |
| 5,423,003 | 6/1995 | Berteau | 395/200 |
| 5,426,427 | 6/1995 | Chinnock et al. | 340/827 |
| 5,442,791 | 8/1995 | Wrabetz et al. | 395/650 |
| 5,457,797 | 10/1995 | Butterworth et al. | 395/650 |
| 5,471,615 | 11/1995 | Amatsu et al. | 395/200.03 |
| 5,473,772 | 12/1995 | Halliwell et al. | 395/650 |
| 5,485,370 | 1/1996 | Moss et al. | 364/408 |
| 5,537,404 | 7/1996 | Bentley | 370/60.1 |

OTHER PUBLICATIONS

Method for Sharing Data Among Parent/Child Software Programs, IBM Technical Disclosure Bulletin, pp.–385–386 Oct. 1993.

*Primary Examiner*—Thomas C. Lee
*Assistant Examiner*—Anderson I. Chen
*Attorney, Agent, or Firm*—Standley & Gilcrest

[57] ABSTRACT

A system for network support of supplemental local applications allows one workstation application, communicating with a host computer on a network, to invoke a second workstation application that takes control of the first application's connection to the network. The first application waits for the second application to terminate and then resumes control of the network connection so that the user is returned to the same point in the work session. The transitions between the workstation applications are automatic and facilitated by the network through a protocol known by both workstation applications and the network. Although the user is aware of the change in applications, the user may never know that an online service host facilitated the transition between the applications.

5 Claims, 7 Drawing Sheets

(1.) Modify supplemental application to support SLAP.

#<application name>;<error check><CR>

<application name> matches application name used by online service host when making request to start SLAP application     <error check> - ASCII representation of the sum of the announcement bytes from '#' to ';', inclusive     <CR> - carriage return.

---

(2.) Install supplemental application on user's workstation.

---

(3.) During installation, modify IM initialization file (IM.INI) to include name of SLAP application and an execution command.

<application name> = <executable file> <command line parameters>

<application name> - identifier sent to IM by network node when user requests SLAP application     <executable file> - DOS path name to the SLAP application     <command line parameters> - static and substituted parameters replaced with current settings. Command line parameters may be the following.

| | |
|---|---|
| %dir | the current IM working directory |
| %userid | the id used to log on in the current connection |
| %port | the current open communications port |
| %baud | the current baud rate |
| %device | the type of communications device in use |
| | Device types include: |
| | LOCAL |
| | NCSI |
| | NASI |
| | WINSOCK |
| | SERIAL |
| | PRINTER |
| | LOCAL |

Figure 4

| Step | Direction | Summary of Action | Action |
|---|---|---|---|
| (1) | WS _ Host | | User invokes IM to establish a connection with the network. |
| (2) | WS _ Host | | User initiates request to perform task handled by SLAP application. |
| (3) | Host _ WS | Application Confirmation Request | Online service host asks IM to confirm existence of one or more supplemental applications.<br><br>PTI_Confirm_Supplemental_Application |
| (4) | WS _ Host | Application Confirmation Response | IM responds to online service host interrogation regarding existence of supplemental applications. Response includes list of host ids.<br><br>PTI_Application_Confirmation |
| (5) | Host _ WS | Invoke Supplemental Application Request | Online service host asks IM to invoke SLAP application.<br><br>PTI_Invoke_Supplemental_Application |
| (6) | | | IM determines that SLAP application is in .INI file and that named executable exists. IM minimizes and awaits resume request. |
| (7) | WS _ Host | Success or Failure Response | IM responds with success or failure to online service host request to invoke SLAP application. |
| Enter SLAP (Supplemental Local Application Protocol) | | | |
| (8) | WS _ Host | Application Announcement | SLAP application announces to online service host the result of the transition from IM.<br><br>#<application name>;<error check><CR> |

Figure 5A

| | | | |
|---|---|---|---|
| (9) | Host_WS | | Online service host acknowledges receipt of SLAP application announcement.<br><br>Transition successful _ foreign host and SLAP application may set up any communication protocol.<br><br>Announcement not made within time-out period _ online service host assumes invocation failed and attempts to regain control of the session.<br><br>CSI = Control Sequence Introducer<br>CSI > a  - application announcement accepted<br>CSI > n - application announcement rejected<br>CSI > r  - resume previous protocol |
| (10) | | Application Specific Dialogue | Successful transition _ SLAP application takes control of communication port and communicates with foreign host. |
| (11) | | | SLAP application terminates.<br><br>Successful termination _ IM awaits online service host resume protocol request and acknowledges it. |
| Exit SLAP<br>Return to online service protocol | | | |
| (12) | Host_WS | Resume Request | Online service host asks IM to resume previous protocol.<br><br>CSI > r |
| (13) | WS_Host | IM Acknowledge | IM acknowledges resume request to online service host.<br><br><ACK> |
| (14) | | | User continues communicating with online service host via IM. |

Figure 5B

SYSTEM FOR TRANSFERRING NETWORK CONNECTIONS FROM FIRST TO SECOND PROGRAM WHERE THE FIRST ENTERS AN INACTIVE STATE AND RESUMES CONTROL OF CONNECTIONS WHEN SECOND TERMINATES

BACKGROUND AND SUMMARY OF THE INVENTION

The present invention relates generally to a computer system that manages transitions between two workstation software applications, running in a graphical interface environment on a multitasking operating system, so that they may use the same network connection to access information residing on a host computer connected to the network. More particularly, the present invention relates to a system for enabling a first workstation application, communicating with a host computer on a wide area network, to invoke a second workstation application and allow the second workstation application to take control of the first workstation's connection to the wide area network and then resume control of the network connection when the second workstation application terminates.

Today, online information services, such as CompuServe® Incorporated, offer their subscribers access to information and services provided by a multitude of host computers connected via a wide area network. Subscribers usually connect to the network through a modem. Once connected, subscribers access the information and services through software residing on the subscribers' workstations. Among the functions performed by the workstation software are managing the connection to the wide area network and managing the presentation of information to the subscriber. The access software that the subscriber uses to communicate with the online information service may be provided by the service itself or it may be provided by another vendor. In either case, the software is general purpose for the online service and provides the base functionality needed to interact with the online service.

Online information services today provide a wealth of information and services to their subscribers. In addition, they provide sophisticated software to help their subscribers access the information they need or want. Despite the variety of needs and interests that online information services are able to meet, subscribers often have a desire to access information and services that are not part of the product suite of the online information service provider (i.e., outside or special applications). For example, a subscriber may be interested in accessing travel information in order to plan a trip. Although some travel information may be available from the online service, the travel planner may be able to get more information from an outside vendor that specializes in compiling and organizing up-to-date travel information from a variety of sources such as hotels, restaurants, and airlines. In addition, the information may be easier to access and understand if the travel planner uses special purpose, rather than online service general purpose, access software for presentation and display.

Today, subscribers usually are required to leave the online service and connect to a host that is not part of the online service (i.e., an outside host) in order to access the outside application. In most cases, subscribers use special access software to connect to and to communicate with the outside host. This method of accessing the outside application may be inconvenient and inefficient. First, the subscriber may be required to leave the online service. Next, the subscriber may be required to invoke the special access software used to connect to and communicate with the outside host. Depending on the sophistication of the access software, the subscriber may need to know special commands to access and use the outside host. Finally, depending on the access mechanism, the subscriber may be required to make a long distance telephone call to connect to the outside host.

Although these outside applications could be integrated into the product suite of the online information service provider, doing so may not be desirable. For example, the online service's general purpose access software that is used to interact with the online service may not have the functionality required to interact with a specialized, outside application. The general purpose access software provided by the online service may have to be modified to accommodate the outside application thereby making the software more cumbersome and difficult to use. In addition, the online service provider, rather than the outside vendor, may need to assume some responsibility for maintaining the outside application.

The present invention—Supplemental Local Application Protocol (hereinafter SLAP)—addresses the needs of both the subscribers and the online information service providers. The present invention provides a mechanism to allow special applications, also referred to as supplemental local applications, to be supported by the online service. These special applications include software residing on an outside host computer as well as workstation software for managing a connection to the outside host and managing the presentation and display of information. First, the invention allows vendors of special applications to make their products more accessible by making them available through the wide area network of the online service provider. Access through the online service wide area network may mean that more subscribers can connect through local, rather than long distance, telephone calls. In addition, the invention allows subscribers, who have connected to the online service using the online service's general purpose access software, to then use a supplemental local application to interact with the special application residing on a host computer that is not a part of the online service. Once the subscriber has finished interacting with the special application, the invention returns the subscriber to the general purpose software session with an online service host computer. The present invention manages the transitions between the online service software and the supplemental local application so that the subscriber is not required to interrupt one session in order to start another. In addition, the invention facilitates transitions between the outside and online service host computers so that the subscriber is not aware the transition is taking place.

The needs of subscribers are met because they may access outside applications without actually leaving the online information service. In addition, subscribers may take full advantage of the outside application because they can use special purpose, rather than general purpose, software to interact with the application. Finally, the online information service provider's involvement with the outside application may be minimized. The online service makes the outside application accessible to a wide subscriber base, but it is not required to assume the added responsibilities of maintaining the special purpose access software for the workstation or the special application residing on the foreign host. Furthermore, the online service provider is not required to modify its general purpose access software to accommodate a variety of special applications. The advantages of the present invention are explained further by the accompanying drawings and detailed description.

DETAILED DESCRIPTION OF PREFERRED EMBODIMENT(S)

Figure 1A:
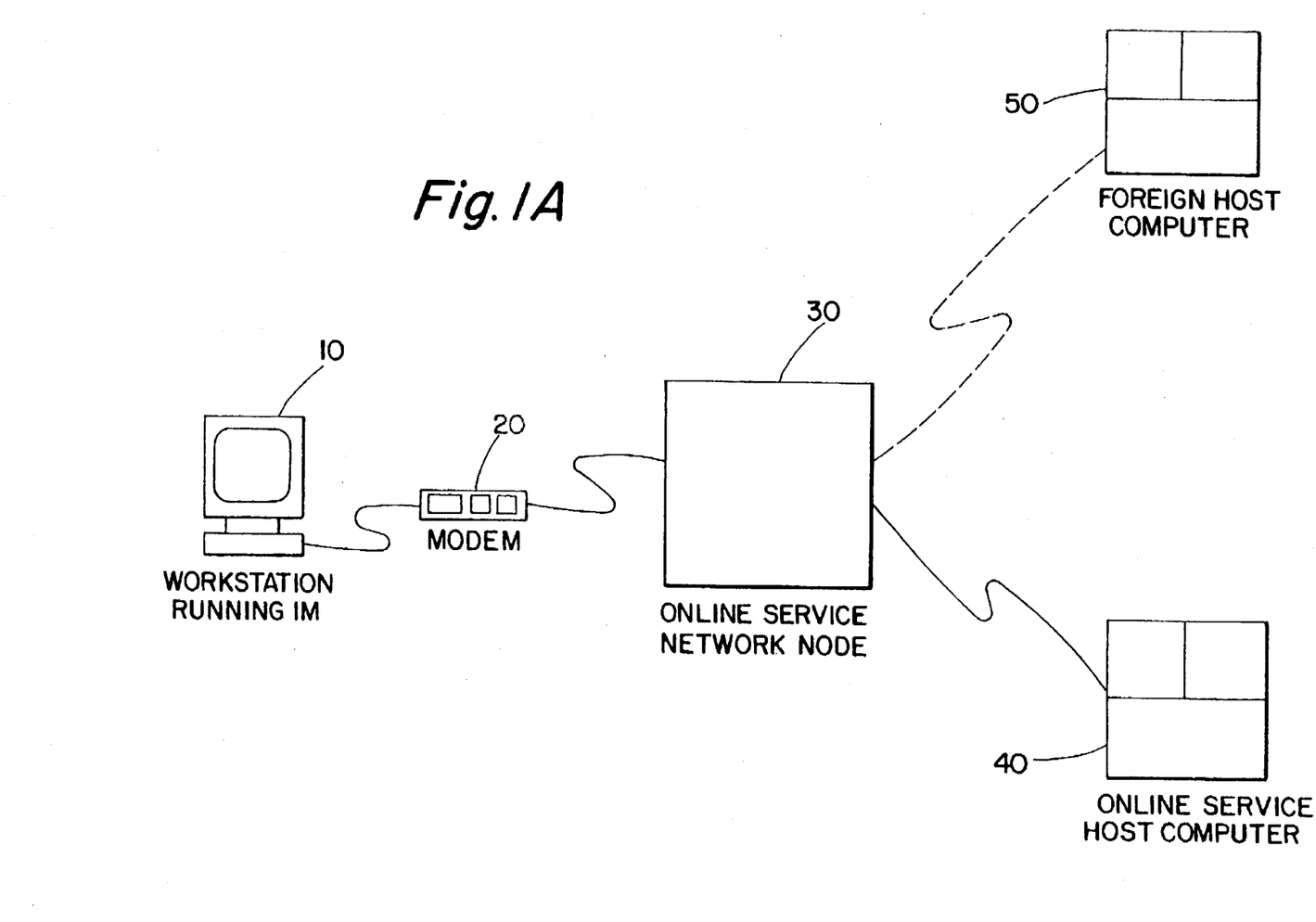
FIG. 1 is a schematic representation of one embodiment of the present invention for using a workstation to run general purpose and special purpose applications to access online service and foreign host computers, shown in two steps in FIGS. 1A and 1B.

Referring now to FIG. 1A, one embodiment of the present invention is shown. FIG. 1A is a schematic representation of one known method for allowing a user at a workstation 10 to connect to a host computer 40 through a network node 30. The workstation 10 may be connected to the network node 30 via a modem 20. The modem connection may be through a cable modem or a modem pool server. Other options may be available as well. The online service host computer 40 and a foreign host computer 50 are connected via a wide area network. The online service network node 30 manages the workstation's connections to the host computers. One network node is shown for simplicity although actually more than one network node may be involved in the connection.

A distinction is made between online service network nodes/hosts and foreign hosts to indicate who owns, operates, and maintains the equipment. The online service owns, operates, and maintains the network node and online service host computer. Control over these devices, as well as others that are part of the wide area network, allows the online service to define how they will communicate. The devices that belong to the online service may use a common language or protocol that facilitates, and possibly optimizes, communication and data transfers. As a result, new devices that understand the protocol may be integrated easily into the online service wide area network. A host is considered foreign flit is not owned, operated, or maintained by the online service.

Referring to FIG. 1A, the connection to the host computer 40 is established, preferably, through the general purpose access software running on the workstation 10. Preferably, this software is provided by the online service so that it knows the online service protocol and may take advantage of special features within the protocol that facilitate data transfers and other communications. This online service general purpose access software may be referred to as the Information Manager or IM. Preferably, the IM manages the connection to the online information service and manages the presentation of information to the user. The IM operates preferably in a multitasking, graphical interface environment such as the Microsoft® Windows™ operating system.

Figure 1B:
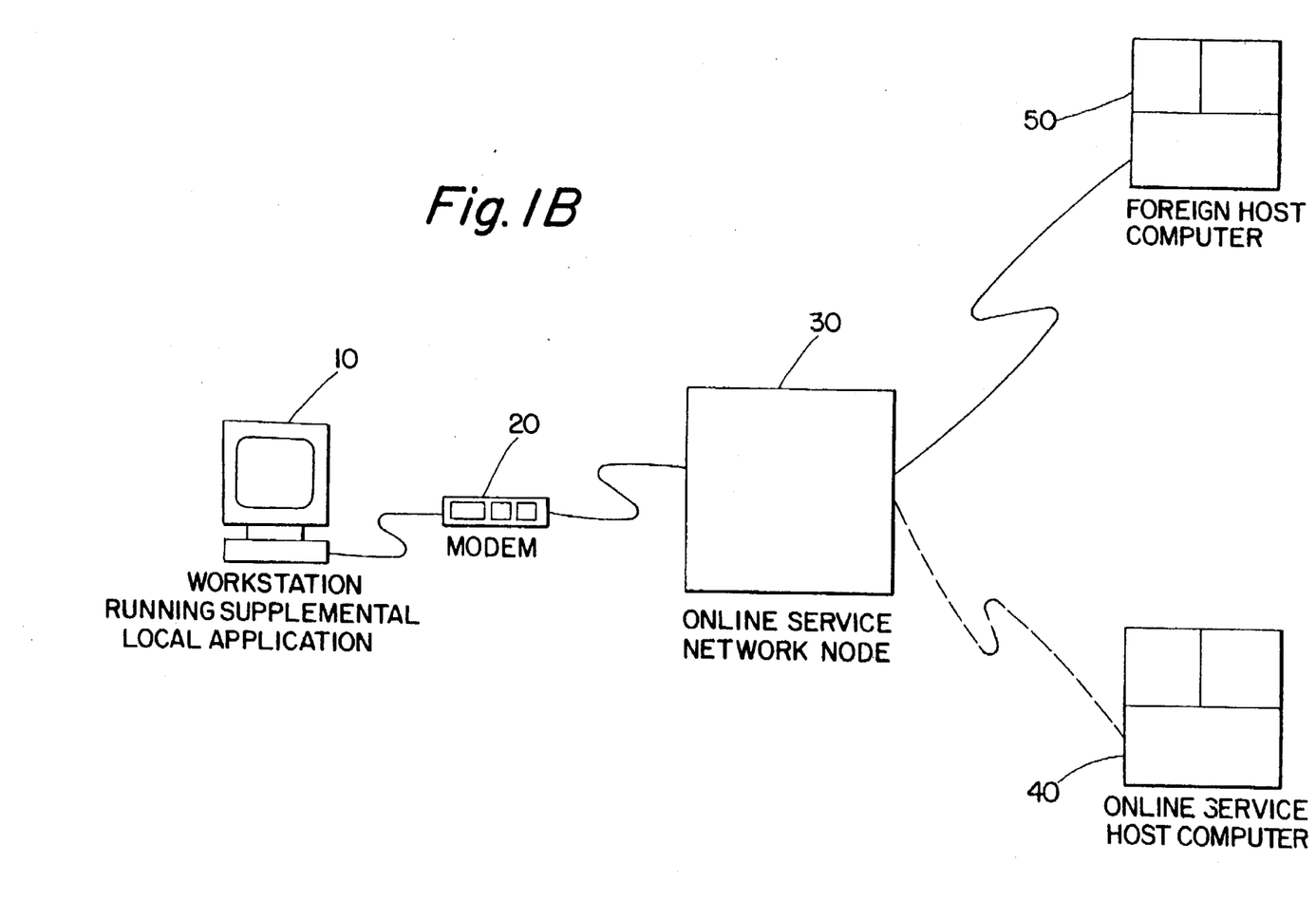

Referring now to FIG. 1B, the workstation 10 may be equipped with another application for accessing information residing on a foreign host computer 50. It may serve a specific purpose, and therefore, may be referred to as a special or supplemental local application. The supplemental local application operates preferably in a multitasking, graphical interface environment such as the Microsoft® Windows™ operating system. If the supplemental local application is provided by a third party, rather then the online service, it may not understand details of the online service protocol and therefore, may not take advantage of special protocol features that facilitate data transfers and other communications. Despite this possible limitation, the user may want to use the supplemental local application because it has special features, not present in the IM, for locating and displaying information. In addition, the information that the user needs may be located on a foreign 50, rather than the online service 40, host computer. Therefore, to take advantage of the supplemental local application, the supplemental local application will be running and the workstation, in this instance, is connected to the foreign host. The workstation 10, which is running the supplemental local application, may connect to the foreign host 50 via the online service network node 30.

Figure 2:
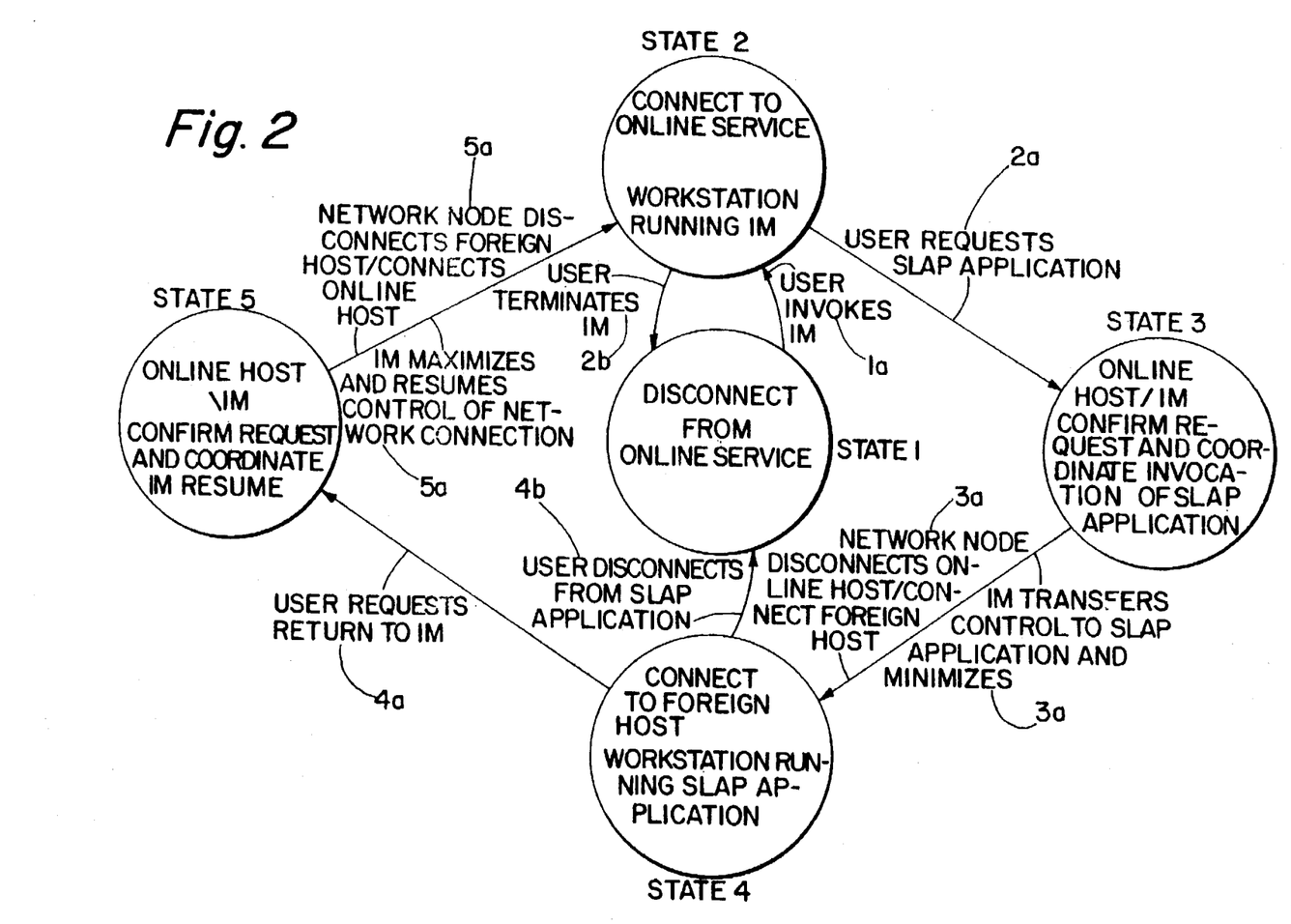
FIG. 2 is a state diagram that represents possible states and transitions for one embodiment of the present invention.

The present invention manages a transition between the IM and online service host to the supplemental local application and foreign host. FIG. 2, a state diagram, illustrates the transition. The states and transitions described here are merely exemplary and illustrate a preferred embodiment of the present invention. In the initial state (State 1), the user may not be connected to the online service. When the user invokes the IM (1a), a connection is established between the user's workstation, the online service network node, and an online service host (State 2).

At some point, the user may request access to the supplemental local application and the foreign host. This request is represented as transition 2a in the state diagram in the third state (State 3), the online service host and IM confirm the request and coordinate the invocation of the supplemental local application and connection to the foreign host. In the next transition (3a), the IM transfers control to the supplemental local application and then minimizes. The network node disconnects from the online service host and connects to the foreign host.

In the fourth state (State 4), the workstation is connected to the foreign host computer via the network node. The workstation is running the supplemental local application rather than the IM. The supplemental local application has control of the IM's connection to the network node and the IM is in an inactive state. The user may use the supplemental local application to interact with the special application residing on the foreign host computer. Although the user is aware of the change between the IM and the supplemental local application, the user may never know that the online service host arranged the transition between the programs running on the workstation and the transition between the host computers.

The transition to the fifth state (4a) occurs when the user requests a return to the IM. The network node arranges to disconnect from the foreign host computer and connect to an online service host computer. An online service host then reactivates the IM which resumes control of the network connection. Once again, the user is aware of the transition between the supplemental local application and the IM, but the user may never know that the online service host arranged the transition between the programs running on the workstation and the transition between the host computers.

From State 4, the user may also request to disconnect from the online service (4b). When this request is made, the user returns to the initial state. As evident from the state diagram, the user may decide to access a number of supplemental local applications before ending the session. The present invention serves the user's requests and may facilitate any number of transitions.

A protocol, called the Supplemental Local Application Protocol or SLAP, is used to manage the transitions between the applications running on the workstation and the transitions between the online service and foreign host computers. SLAP is understood by the IM and programs running on the online service host computers. The supplemental local application participates by accepting defined parameters passed on a command line and announcing itself to the online service. SLAP permits applications that do not understand the details of the online service protocol to nonetheless communicate and operate in the online service environment. The supplemental local application, which understands the Supplemental Local Application Protocol, is called a SLAP application.

Figure 3:
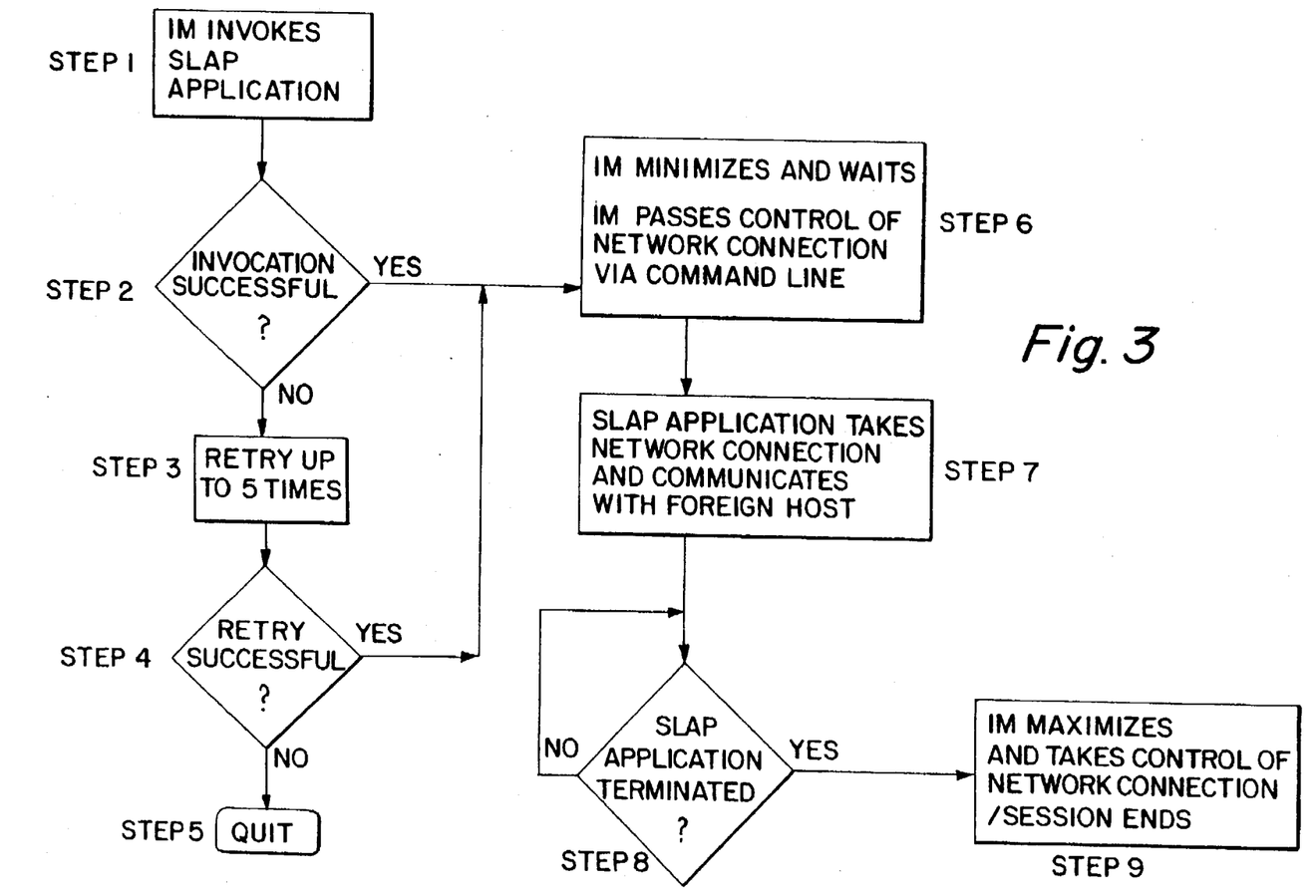
FIG. 3 is a flow diagram of the preferred system of workstation transitions for the present invention.

For the workstation, SLAP provides a means for invoking a SLAP application and a means for returning to the IM. FIG. 3 presents a conceptual view of a preferred embodiment of the present invention as it operates on the workstation. The present invention operates when the user, who is connected to an online information service host via the IM, initiates a request to perform a task to be handled by the SLAP application and a foreign host. In Step 1, the IM invokes the SLAP application. If the invocation is unsuccessful (Step 2), the IM tries again up to five times (Step 3 and Step 4).

If the invocation is successful (through Step 2 or Step 4), Step 6 is executed and the IM is minimized. The process of minimizing a workstation application in a multitasking, graphical interface environment is well known and is not explained here. When the IM minimizes, it enters an inactive state, but it continues to run. As a result, information about the appearance of the workstation display and associated activities is preserved. Therefore, the user may be returned to the point he or she was before the SLAP request was initiated.

In addition to minimizing, the IM passes to the SLAP application a unique identifier or handle for the communication port through which the IM is connected to the network node (Step 6). Using this information, the SLAP application may then take control of the IM connection to the network node. The details of passing this information to the SLAP application are explained in connection with FIG. 4.

As shown in Step 7, after the IM minimizes, the SLAP application starts running. The SLAP application takes control of the IM's, and hence the workstation's, connection to the network node. Because the network node has established a connection to the foreign host, the user may communicate with the foreign host via the SLAP application. If the user tries to maximize or switch to the IM while the SLAP application is running, the IM refuses to respond to the request.

Although the IM is minimized and is technically inactive at this point, it has the ability to monitor the state (active or not running) of the SLAP application. The ability of the IM to monitor the state of another application running on the workstation is unique to SLAP as implemented in a multitasking, graphical interface environment. It is well known that one function of a multitasking operating system is to control the execution of applications. Because the operating system performs this function, one application running on the workstation does not need to know whether other applications are running. However, one objective of SLAP is to return the user to the IM session after the SLAP application terminates. This objective is accomplished through the IM's monitoring of the SLAP application. When the SLAP application terminates (Step 8), the IM maximizes and takes control of the connection (Step 9). As a result, the user returns to the same point he or she was before the IM minimized.

Figure 4:
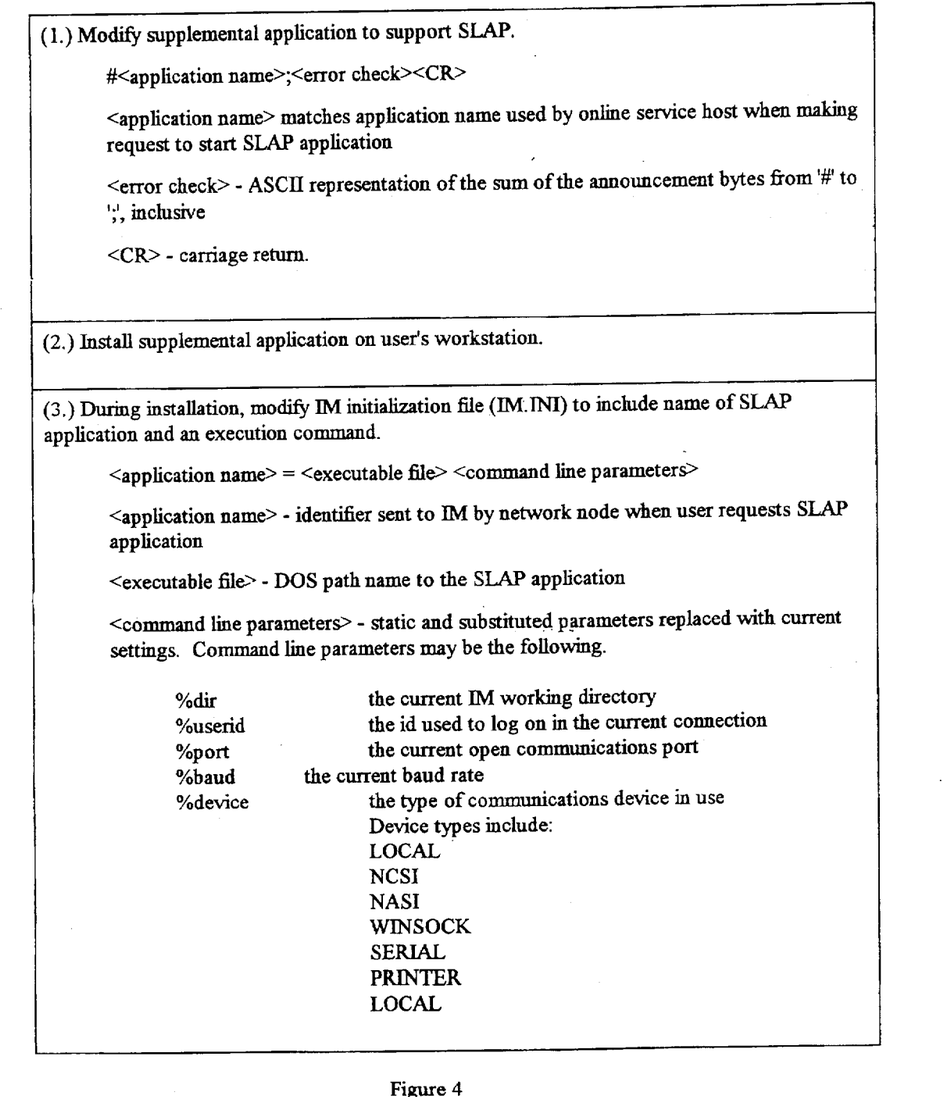
FIG. 4 shows a preferred method for desiring or modifying a supplemental local application to communicate with the online service network.

Referring now to FIG. 4, setup details for the protocol are shown. FIG. 4 illustrates one embodiment in which the present invention may operate. Details of the protocol may vary without departing from the spirit and scope of the invention. To take advantage of the protocol, the SLAP application source code may be modified so that it can announce itself to the online service and accept command line parameters (Step 1). The announcement provides verification that the transition between the IM and the SLAP application succeeded. The announcement is preferably an ASCII string composed of the characters '' (decimal 32) through '~' (decimal 126), inclusive. The process of creating an ASCII string is known in the art and therefore, is not explained. Preferably, the announcement format is as follows:

<application name>;<error check><CR> where <application name> matches the application name used by the online service host in a request to invoke a SLAP application and <error check> is the ASCII representation of the sum of the ASCII values of the announcement bytes from '#' to ';', inclusive. The <error check> may be computed as a signed, sixteen bit integer value. The process of converting integers to character strings is well known in the art and is not explained here. The announcement may be terminated by a carriage return <CR>.

In Step 2, the SLAP application is installed on the workstation. As shown in Step 2, the name of the SLAP application, along with an execution command, is added to the IM initialization file. This information tells the IM about the SLAP application so that at the appropriate time, the IM may invoke the application and pass to the SLAP application the information needed to take control of the network connection. The format is, preferably, as follows:

<application name>=<executable file><command line parameters> where <application name> is an identifier sent to the IM by the network node when the user requests the SLAP application. The <executable file> is a path name to the SLAP application. The <command line parameters> consist of static text and substituted parameters that the IM may replace with current settings. The process of setting and reading a command line is well known in the art and is not explained here. However, the information passed on the command line is explained because it is through the command line, with the current settings, that the IM is able to tell the SLAP application how to take control oft he connection to the network. The available substitutable settings are:

% dir the current IM working directory

% userid the id used to log on in the current connection

% port the current open communications port

% baud the current baud rate

% device the type of communications device in use

The type of the communications device (% device) tells the SLAP application how to interpret the communications port (% port) setting. The types of devices may include "LOCAL," "NASI," and "NCSI." Preferably, the port parameter is set to the numeric value for the identifier or open handle for the device.

Figure 5A:
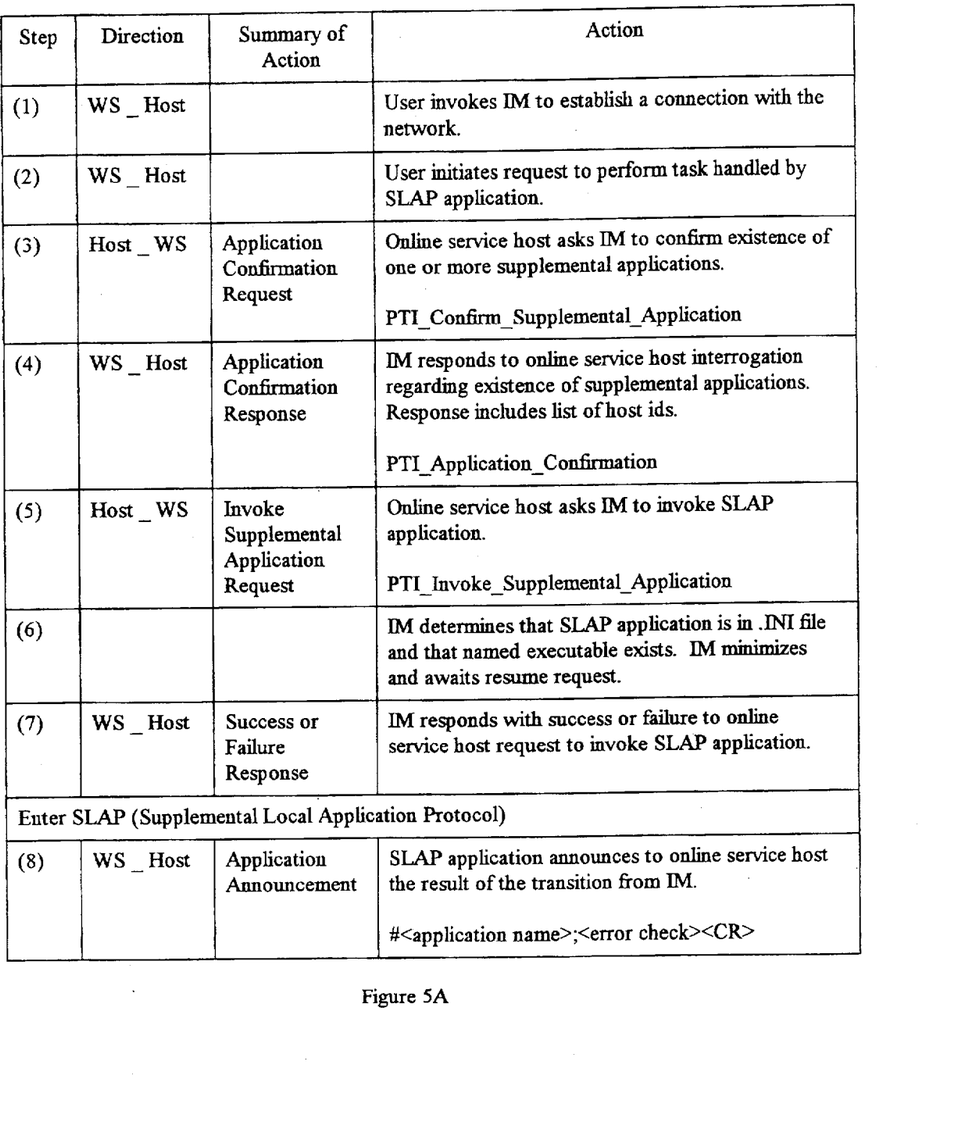
FIGS. 5A and 5B show a connection diagram illustrating the steps of transferring a network connection between a primary workstation application and a supplemental local application.
Figure 5B:
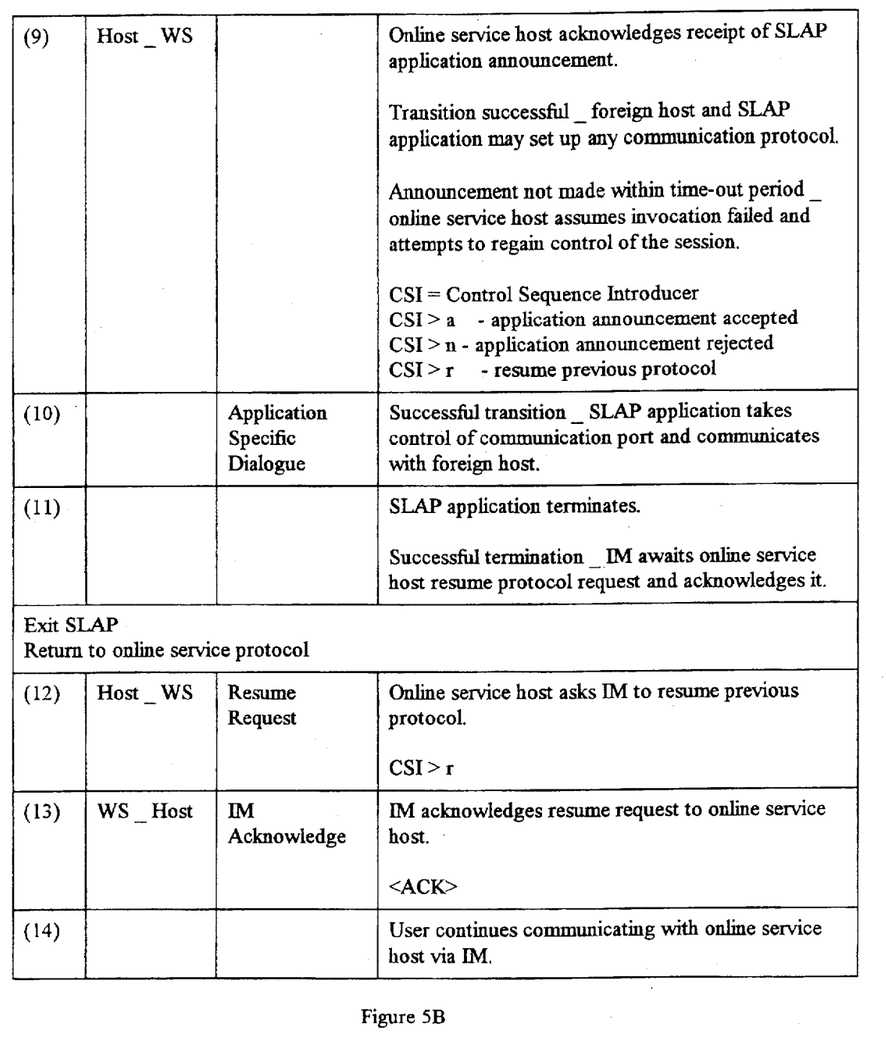

After setup, the SLAP application, the IM, and the online service host application may communicate using the protocol of the present invention. FIGS. 5A and 5B show the steps in the protocol. The form described here is merely a preferred or exemplary embodiment. For each step, the direction and a summary of the communication is shown. In addition, details of the action are provided. Information in italics refers to messaging details that the IM, SLAP application, and online service host expect to send or receive.

Referring now to FIG. 5A, as shown in Step 1, the session may begin with an IM connection to an online service host. Both the IM and the online service host understand the online service protocol so each may take advantage of special features in the protocol. In Step 2, the user initiates a request to be handled by the SLAP application. In Step 3, the online service host responds to the request by initiating an application confirmation request from the IM to confirm that the SLAP application has been installed on the user's workstation. If the IM determines the SLAP application exists, it responds to the online service host with an application confirmation response (Step 4). In Step 5, the online service host asks the IM to invoke to SLAP application. The request includes the application name that the SLAP application is expected to use in its announcement. To respond to the request, the IM looks in the IM intialization file for the requested SLAP application and then makes a system call to determine that the application exists (Step 6). If the application exists, the IM invokes the SLAP application and passes the current communication settings via the command line so that the application may assume control of the connection. The IM then minimizes. While minimized, the IM monitors the state of the application, In Step 7, the IM tells the online service host that the invocation of the SLAP application was successful.

It is at this point that the SLAP application starts communicating with the online service network node. Technically, the SLAP protocol has been entered because the supplemental local application, which is not developed or maintained by the online service provider and therefore, does not understand details of the online service protocol is communicating with the online service. Referring now to FIG. 5B, as shown in Step 8, the SLAP application announces itself to the online service host. The online service host responds with an acknowledgement (Step 9). If the transition between the IM and SLAP application is successful, the SLAP application takes control of the connection and communicates with the foreign host (Step 10).

When the SLAP application terminates (Step 11), the IM maximizes and awaits a resume request from the online service host. After the resume request (Step 12) and an acknowledgment by the IM (Step 13), the user may continue communicating with an online service host via the IM. The IM and online service host may once again use the online service protocol, rather than the SLAP protocol, to facilitate communications (Step 14).

The present invention is unique because it manages transitions between two workstation applications, running in a graphical interface environment on a multitasking operating system, so that they may use the same network connection to access information residing on a host computer connected to the network. The transitions are facilitated through a protocol known by the two workstation applications and an online service host to which the workstation is connected. The present invention has been described in the form of preferred embodiments, but several modifications and variations to the invention could be made and fall within the scope of the subjoined claims.

What is claimed is:

1. A computer system that manages transitions between workstation applications said system comprising:
    a network node within a wide area network of online service and foreign host computers;
    a workstation connected to said network node through a first computer program that manages a network connection and manages presentation of information;
    a second computer program on said workstation capable of managing said network connection and managing presentation of information to the user;
    a means for transferring network connection information from said first computer program to said second computer program whereby said second computer program may take control of said network connection and said first computer program may resume control of said network connection when said second computer program terminates;
    means associated with said first computer program, said second computer program, and said network node to communicate network connection and program state information.

2. The computer system of claim 1, further comprising:
    means associated with said network node and said workstation for invoking said second computer program on said workstation, inactivating said first computer program, and connecting said workstation to said foreign host computer.

3. A method for transitioning between workstation applications, said method comprising the steps of:
    providing a first computer program on a workstation to manage a network connection and to manage presentation of information;
    providing a second computer program on said workstation to manage a network connection and to manage presentation of information;
    providing a network node capable of communicating with said first and said second computer programs;
    providing a means for said first computer program to transfer network connection information to said second computer program so said second computer program may take control of said network connection;
    providing a means for said first computer program and said second computer program to communicate network connection control information to said network node;
    providing a means for said first computer program to enter an inactive state and monitor state said second computer program; and
    providing a means for said first computer program to resume control of said network connection when said second computer program terminates.

4. A system for managing transitions between workstation applications comprising:
    a wide area network of online service and foreign host computers;
    a network node for managing connections to said online service and said foreign host computers;
    a workstation capable of connecting to said network node;
    a first computer program at said workstation for managing a connection to and managing presentation of information from said online service host computer;
    a second computer program at said workstation for managing a connection to and managing presentation of information;

a third computer program at said network node for managing said connections whereby said first, said second, and said third computer programs may communicate using a matching protocol;

said network node causes said workstation to invoke said second computer program;

said first computer program transfers network connection information to said second computer program so said second computer program may communicate with said network node through said connection;

said first computer program monitors state of said second computer program so that said first computer program may resume control of said connection when said second computer program terminates.

5. A computer system that manages transitions between workstation applications said system comprising:

a network node within a wide area network of online service and foreign host computers;

a workstation connected to said network node through a first computer program that manages a network connection and manages presentation of information;

a second computer program on said workstation capable of managing said network connection and managing presentation of information to the user;

means associated with said first computer program and said second computer program on said workstation to communicate via said network node network connection and program state information;

a means for transferring network connection information from said first computer program to said second computer program whereby said second computer program may take control of said network connection, said first computer program, after transferring said network connection information enters an inactive state and monitors said second computer program state, and said first computer program may resume control of said network connection when said second computer program terminates.

* * * * *

UNITED STATES PATENT AND TRADEMARK OFFICE
CERTIFICATE OF CORRECTION

PATENT NO. : 5,680,549

DATED : October 21, 1997

INVENTOR(S) : Randy W. Raynak and Viktor Kushnir

It is certified that error appears in the above-identified patent and that said Letters Patent is hereby corrected as shown below:

In column 3, line 48, please delete the word "flit" and replace it with -- if it --.

In column 4, line 32, please delete "diagram in" and replace it with -- diagram. In --.

In column 5, line 46, please delete "connection" and replace it with -- conjunction --.

In column 6, line 53, please delete "oft he" and replace it with -- of the --.

In column 7, line 40, after "protocol", please insert -- , --.

Signed and Sealed this

Twenty-fourth Day of February, 1998

Attest:

BRUCE LEHMAN

*Attesting Officer*        *Commissioner of Patents and Trademarks*